United States Patent [19]
Miller et al.

[11] Patent Number: 5,869,942
[45] Date of Patent: Feb. 9, 1999

[54] NOISE SUPPRESSION IN RELAY-SWITCHED MOTORS

[75] Inventors: Nicholas J. Miller; John R. Suriano; Peter H. Thompson; Roger A. Heimberger, all of Dayton, Ohio

[73] Assignee: ITT Automotive Electrical Systems, Inc., Auburn Hills, Mich.

[21] Appl. No.: 815,834

[22] Filed: Mar. 12, 1997

[51] Int. Cl.[6] ................................................. G05B 5/00
[52] U.S. Cl. ........................... 318/483; 318/629; 318/65; 318/794; 318/795; 318/DIG. 2; 318/521; 310/50; 361/50
[58] Field of Search ..................................... 318/483, 629, 318/65, 794, 795, DIG. 2, 521; 310/50; 361/50

[56] References Cited

U.S. PATENT DOCUMENTS

| | | | |
|---|---|---|---|
| 4,348,603 | 9/1982 | Huber | 310/50 |
| 4,673,851 | 6/1987 | Disser | 318/341 |
| 4,829,298 | 5/1989 | Fernandes | 340/870.27 |
| 4,948,242 | 8/1990 | Desmond et al. | 35/637 |
| 5,583,730 | 12/1996 | Gershen et al. | 361/50 |

OTHER PUBLICATIONS

"Radiation Emissions From 10 KHz to 1000 MHz, EMC–Component Test Procedure", General Motors Corporation, 9114p (May, 1995).

*Primary Examiner*—Karen Masih
*Attorney, Agent, or Firm*—J. Gordon Lewis; Thomas N. Twomey

[57] ABSTRACT

Noise suppression system for a relay-switched windshield wiper, wherein reversal of current to a motor driving the wiper causes the motor to reverse. Filters contained within the motor, together with filters and shielding located external to the motor, suppress rf emissions.

12 Claims, 9 Drawing Sheets

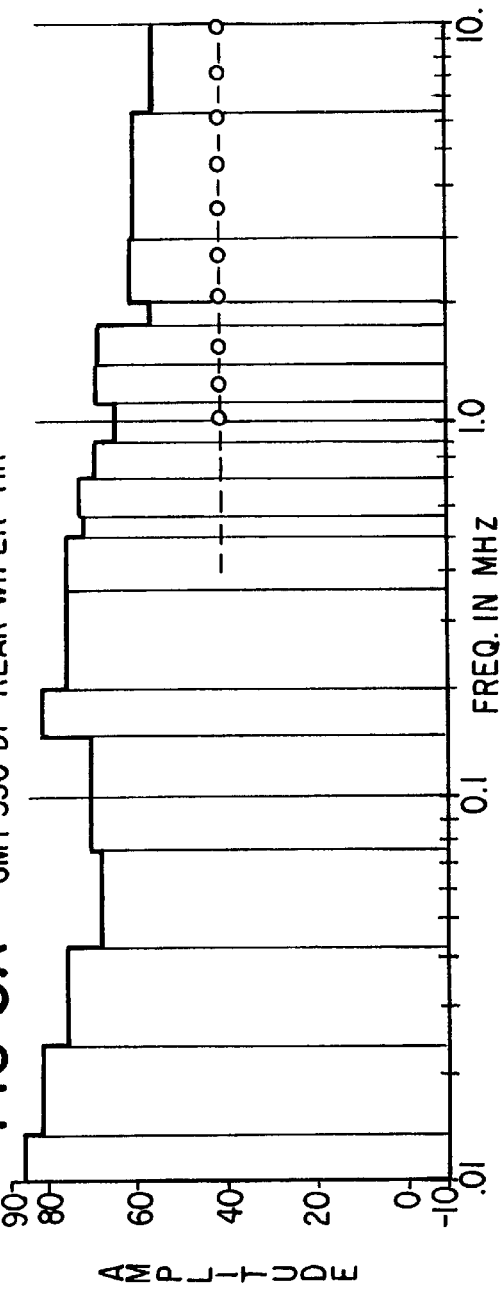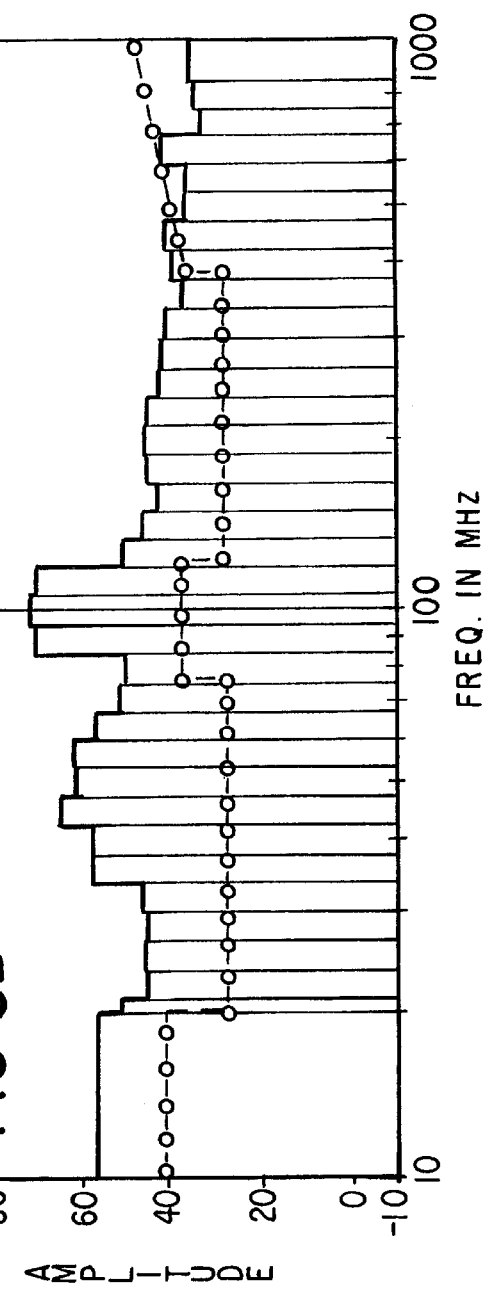

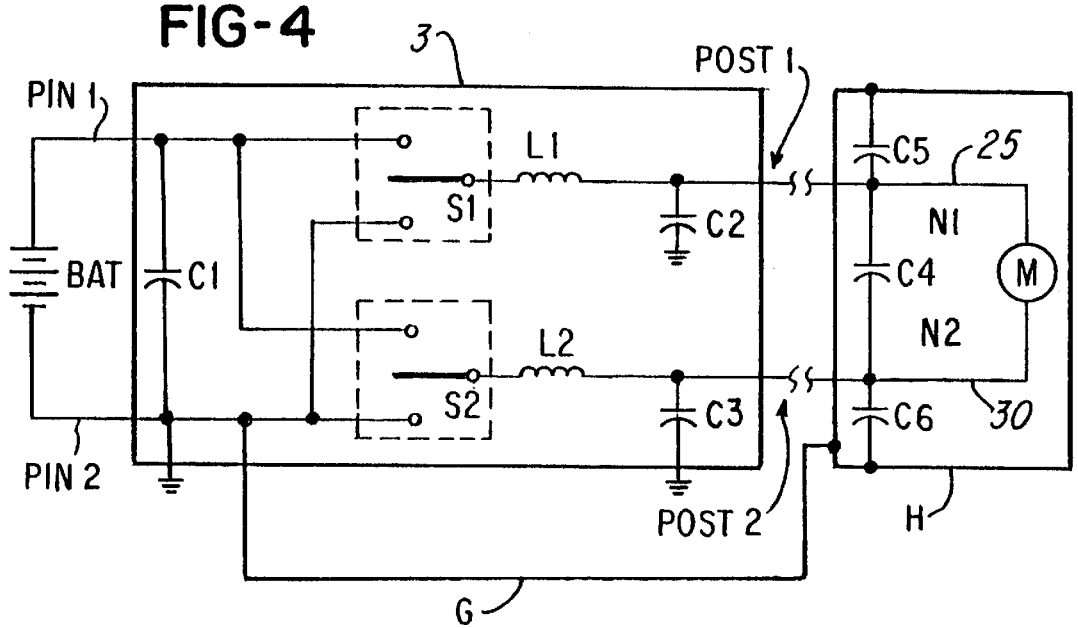
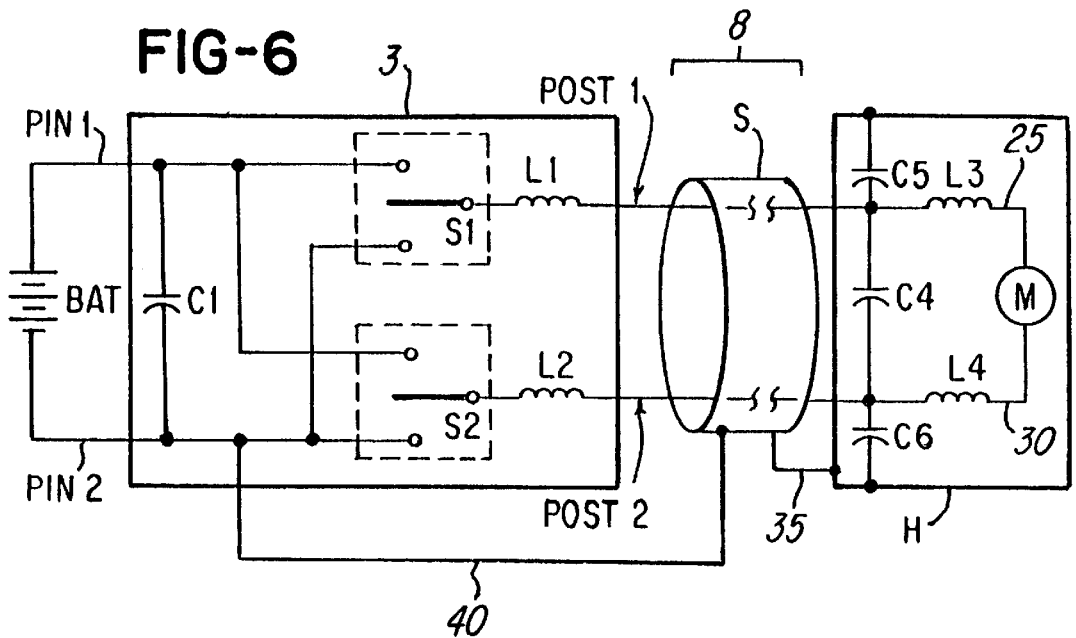

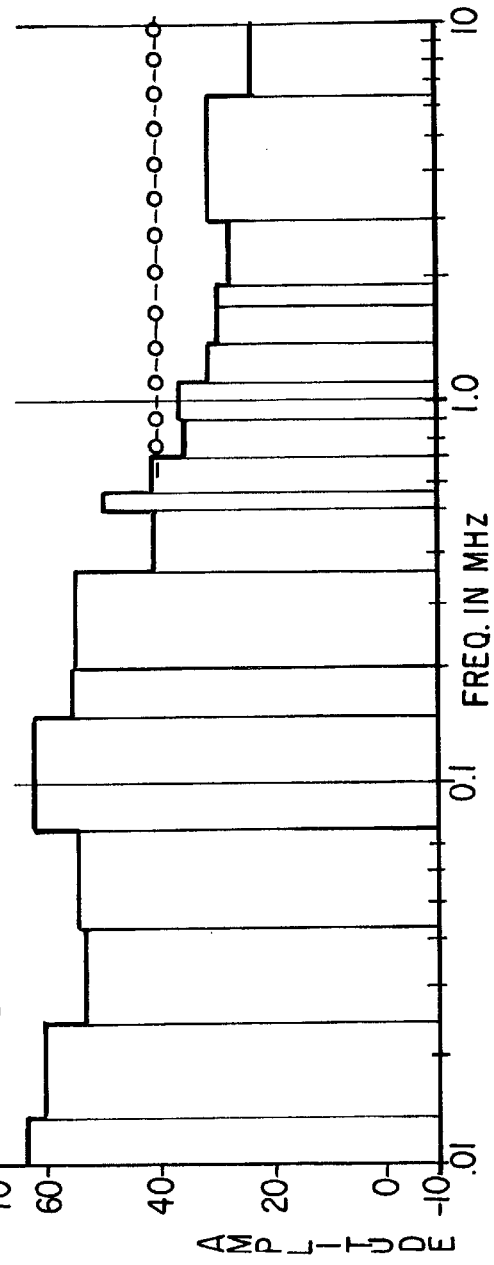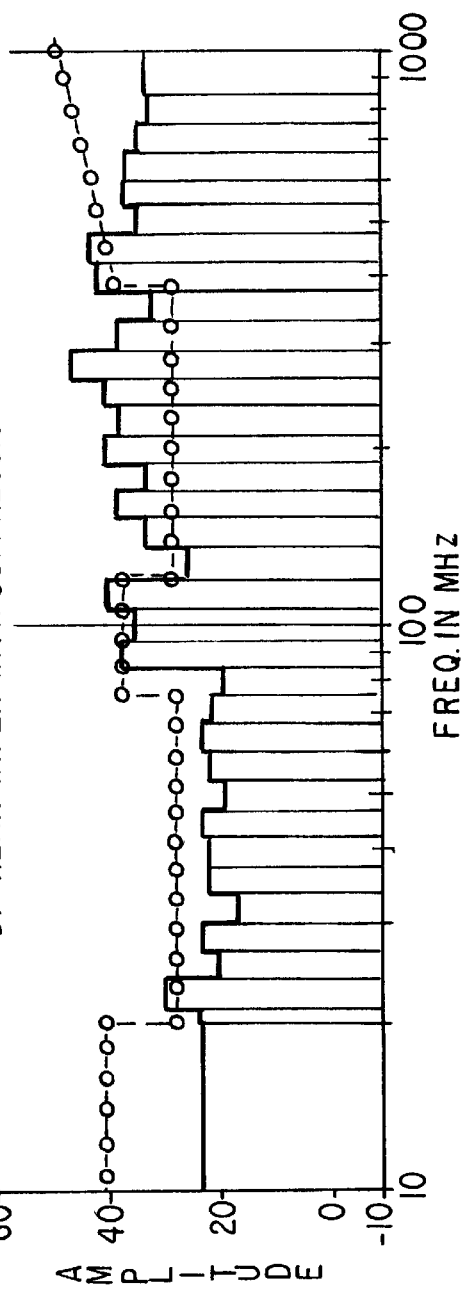

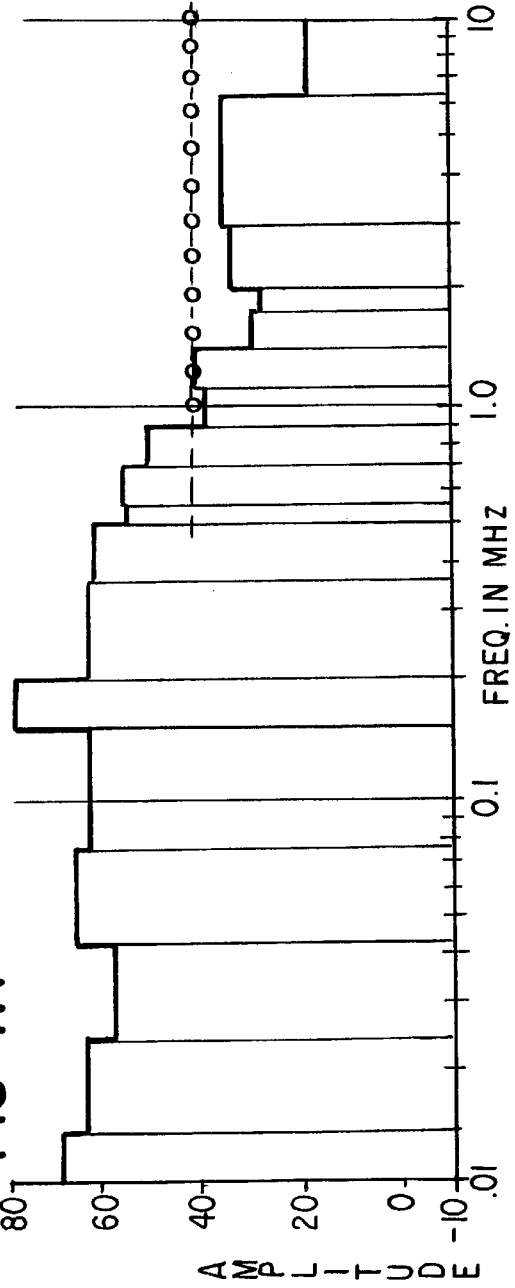
FIG-7A  DP REAR WIPER, ENG. SAMPLE
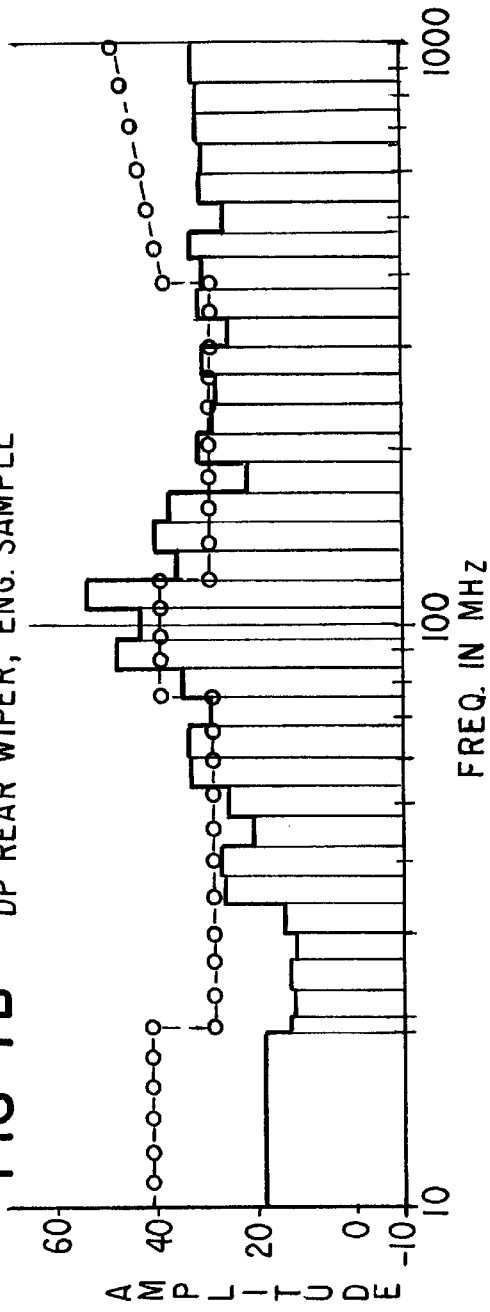
FIG-7B  DP REAR WIPER, ENG. SAMPLE

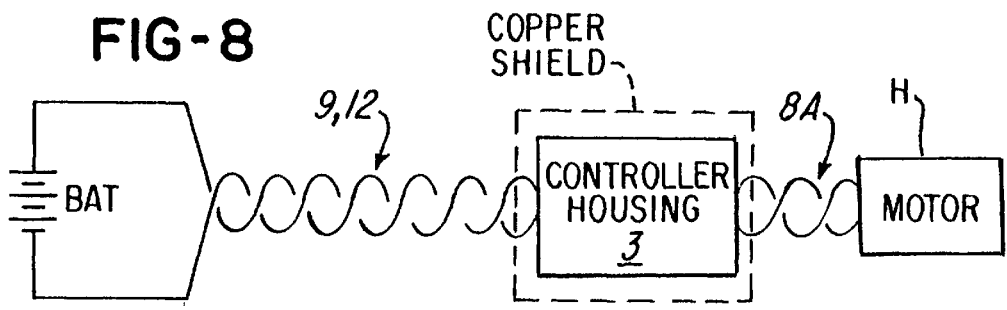
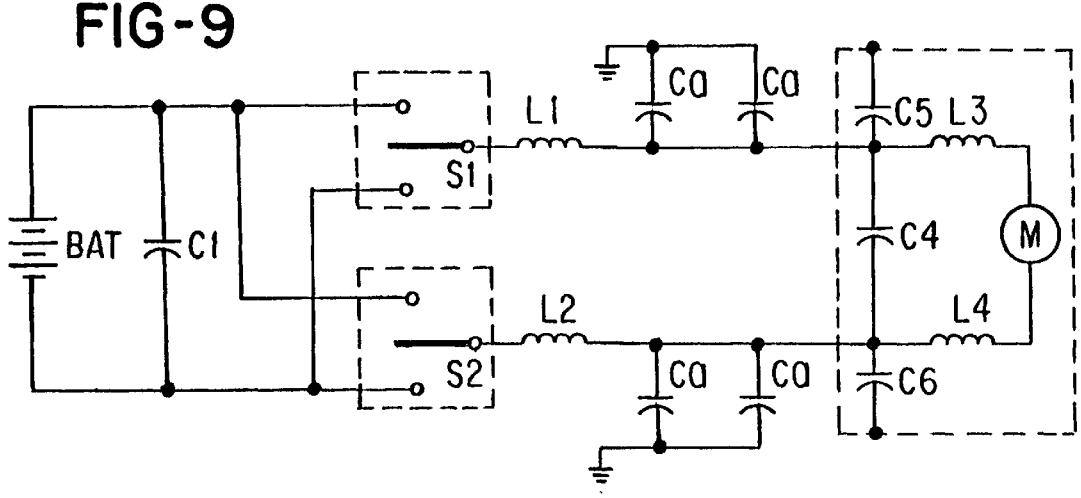
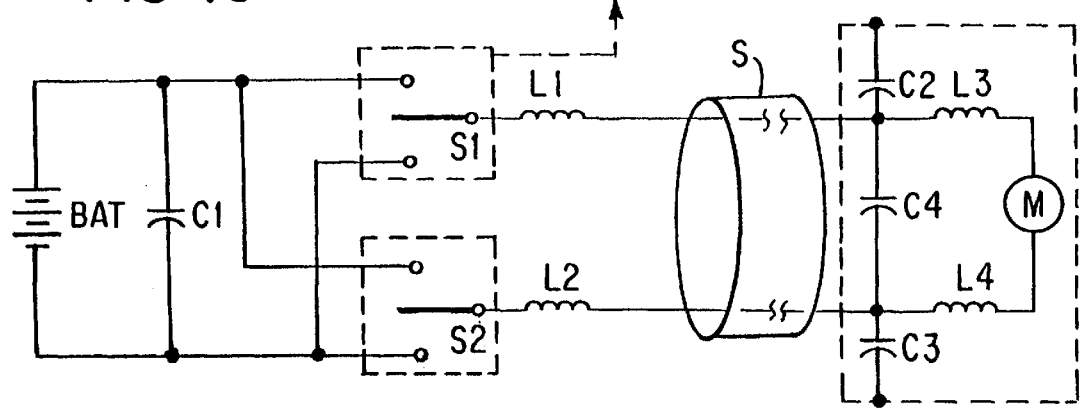

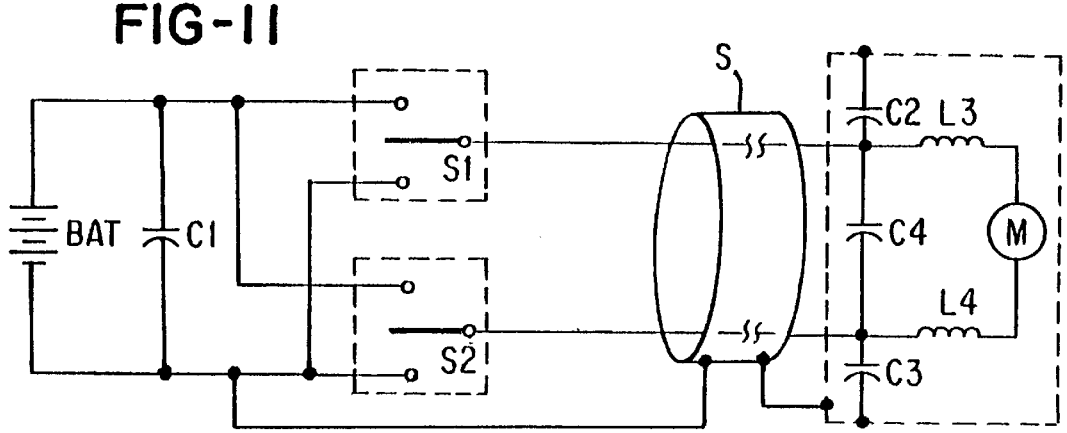
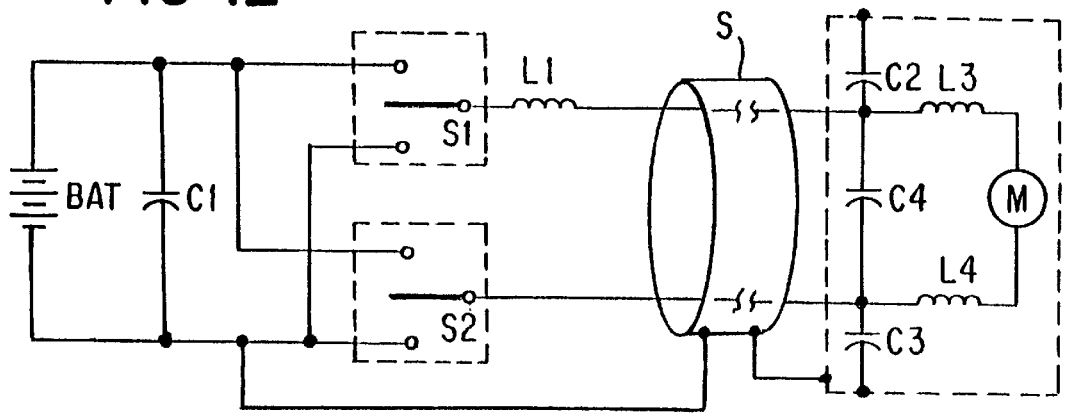

NOISE SUPPRESSION IN RELAY-SWITCHED MOTORS

BACKGROUND OF THE INVENTION

1. Field of the Invention

The invention concerns suppression of electrical noise in motors which are controlled by mechanical relays and, in particular, motors in which the relays periodically reverse the current fed to the motors, in order to reverse motor rotation. Windshield wipers in motor vehicles utilize such motors.

2. Description of Related Art

FIG. 1A illustrates a prior-art system for changing direction of an electric motor M, which drives windshield wipers (not shown) in an automotive vehicle. When the relays S1 and S2 are in the position shown in FIG. 1B, current I flows in the direction indicated, and the motor M rotates in one direction. When the relays S1 and S2 switch to the position shown in FIG. 1C, the current reverses to Ir, and the motor reverses direction.

This motor M is can be located on a tailgate of a motor vehicle.

The Inventors have found that the system of FIGS. 1A–1C produces the radio-frequency emissions shown in FIGS. 3A–3B. The dotted line in FIG. 3 indicates a reference, for use in comparison with other plots, discussed later.

These emissions can interfere with radios, tape players, televisions, ham radios, cellular telephones, and possibly radar detectors, which are used by the occupants of the vehicle, or used by nearby persons. Capacitors Cl and C4 in FIGS. 1A–1C are intended to suppress these emissions, but, as the plot of FIGS. 3A–3B indicate, they do not achieve full suppression.

OBJECTS OF THE INVENTION

An object of the invention is to provide an improved windshield wiper system.

A further object of the invention is to provide reduction of radio-frequency emissions in an electric motor.

SUMMARY OF THE INVENTION

In one form of the invention, a noise suppressor holds radiated emissions below 40 dB-microvolt/meter for a substantial part of a frequency band spanning from 1.0 MHz to 10 MHz.

BRIEF DESCRIPTION OF THE DRAWINGS

FIGS. 3A and 3B illustrate measured noise emitted by the system of FIG. 1;

FIG. 4 illustrates another form of the invention;

FIGS. 5A and 5B illustrate a plot of measured noise emitted by the system of FIG. 4;

FIG. 6 illustrates another form of the invention;

FIGS. 7A and 7B illustrate a plot of measured noise emitted by the system of FIG. 4; and FIGS. 8–14 illustrate additional embodiments of the invention.

DETAILED DESCRIPTION OF THE INVENTION

Figure 1A:
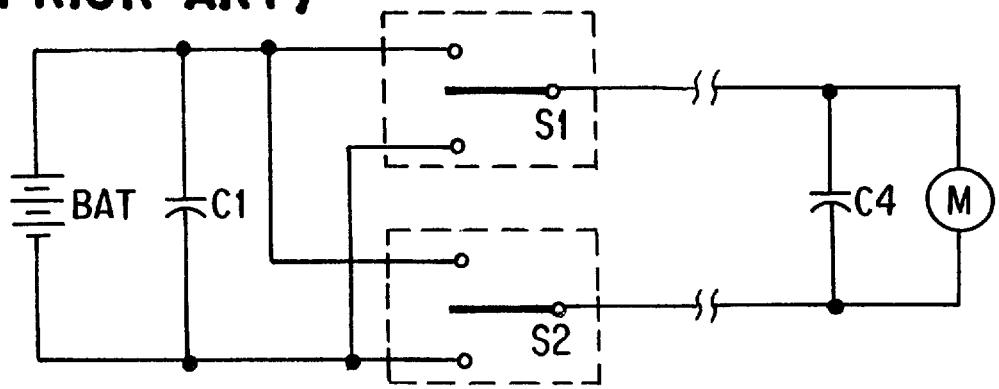
FIGS. 1A, 1B and 1C illustrate a prior-art windshield wiper motor M, and its reversing control 3.
Figure 1B:
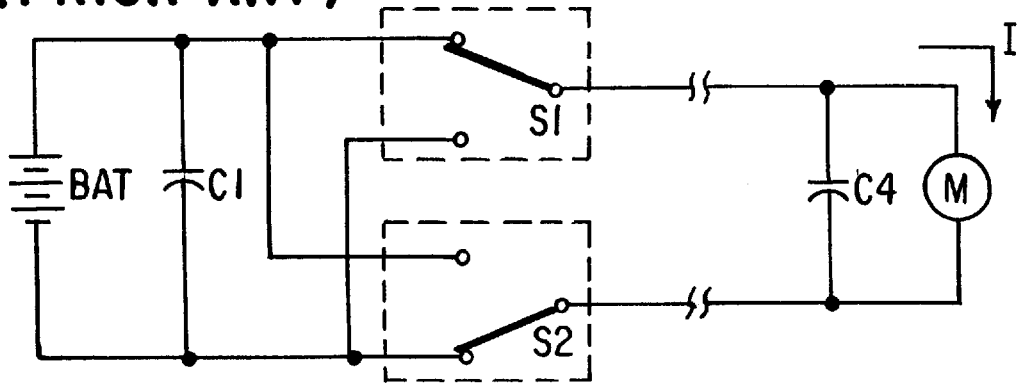
Figure 1C:
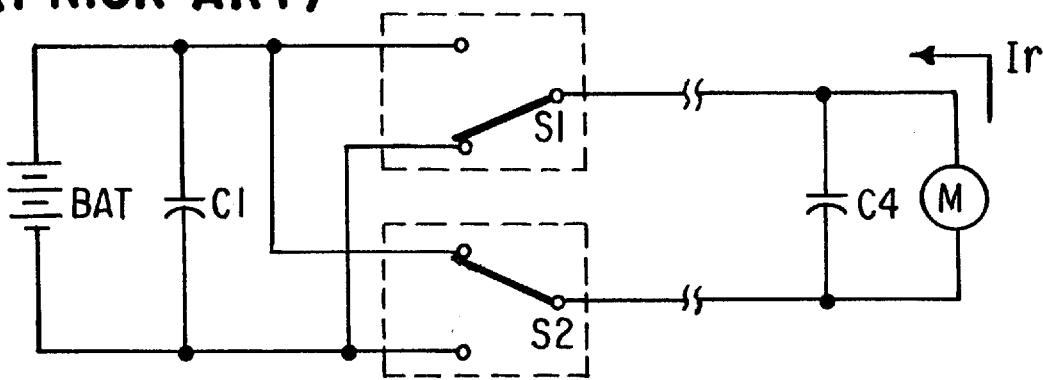

FIG. 4 illustrates one embodiment of the invention. Table 1, below, gives the values of the components shown in the FIG. 4.

TABLE 1

| Component in FIG. 4 | Component Value |
|---|---|
| L1 | 1.8 microHenry |
| L2 | 1.8 microHenry |
| C1 | 0.22 microFarad in parallel with 0.47 microFarad (both stacked film) |
| C2, C3, C4 | 0.1 microFarad (ceramic) |
| C5, C6 | 0.01 microFarad (stacked film) |

In addition, a grounding cable G connects the conductive housing H of the motor M to the ground G1 of a controller 3. This cable G was used in bench-testing the invention, as well as when the invention is used in a vehicle. One reason for use of cable G in a vehicle is that the motor M is fastened to the vehicle through rubber stand-offs, which electrically isolate the motor M from the vehicle body, which is normally considered as a DC ground.

Capacitors C4, C5, and C6 are physically located within the conductive housing H of the motor. In one embodiment, the housing H is a fabricated conductive shell, which completely surrounds the motor, but contains small apertures which allow entry of power leads to nodes N1 and N2.

Each capacitor acts as a radio-frequency short-circuit. Capacitor C4 shorts the power leads 25 and 30 together, and capacitors C5 and C6 short the housing H to the power leads 25 and 30. As a quantitative example of a short-circuit, the impedance of a capacitance in general is given by the expression 1/jwC, wherein w represents radian frequency, C is capacitance, and j is the imaginary operator.

As an example, for a 1 micro-Farad capacitor at 10 MHz, the impedance is about 0.016 ohms (imaginary), which is taken as a short circuit. In general, impedances up to about $\frac{1}{10}$ ohm can be considered as short circuits, although it is possible that higher impedances can be used in certain cases.

The control C receives power from battery BAT on lines Pin1 and Pin2. The control 3 delivers power on lines Pout1 and Pout2.

FIGS. 5A–5B illustrate results of a bench test of rf emissions produced by the system of FIG. 4, but with capacitor C4 absent. The dotted line corresponds to that of FIGS. 3A–3B. Several significant features of FIGS. 5A–5B are the following:

1. In the frequency range from about 1.0 MHz to about 20 MHz, emissions are held below 40 dB-microvolt/m. The units dB-microvolt are referenced to one microvolt, according to the expression:

amplitude in dB=20×log (noise amplitude/1.0 microvolt)

wherein noise amplitude is measured in microvolts. Thus, 40 dB-microvolts corresponds to a noise signal of 100 microvolts:

40=20×log (100 microvolts/1.0 microvolts)

2. In the same frequency range from about 1.0 MHz to about 20 MHz, emissions, on average, are held below 30 dB microvolt/meter.

"On average" herein implies a particular type of averaging, namely, a graphical, or equivalent, averaging of a logarithmic plot, such as that shown in FIGS. 5A–5B. This type of averaging is, in general, different from ordinary numerical averaging, as an example will illustrate.

Consider a Range 1 in FIG. 5B, which is not labeled, but which runs between 10 MHz and 100 MHz. In Range 1 there exist 10 bands of 10 MHz each. In a Range 2, between 100 MHz and 1,000 MHz, there exist 900 bands of 10 MHz each. Range 2 contains a vastly greater number of bands than Range 1, yet, in FIG. 5D, Range 2 occupies the same horizontal distance as Range 1, because the frequency scale is logarithmic.

If ordinary numerical averaging were used, Range 2 would dominate the average, because each 10-MHz-band contributes to the average. Range 2 contains 900 bands, while Range 1 contains 10 bands. However, a graphical averaging, in effect, treats both Ranges as containing the same number of Bands. Further, the graphical averaging has the advantage of allowing a direct comparison of two systems under examination, straight from plotted test data.

In effect, the averaging under consideration is a weighted average, wherein each decade of frequencies contributes the same number of samples to the average. (10 MHz to 100 MHz represents one decade, and 100 MHz to 1,000 MHz represents another decade.)

As a specific example, in the range from 1.0 to 10 MHz, the amplitudes at 2.0, 3.0, 4.0, . . . 10.0 are taken. In the range from 10 MHz to 100 MHz, the amplitudes at 20, 30, 40, . . . 100 MHz are taken. These 20 samples are averaged together to find the average amplitude in the overall range, from 1.0 to 100 MHz.

Therefore, in "averaging" as herein defined, each decade (or octave) contributes the same number of terms to the average. This can be called "uniform decade averaging."

3. In the frequency range from about 1.0 MHz to about 10 MHz, emissions, on average, are held below 30 dB microvolt/meter.

4. In the frequency range from about 10 MHz to about 100 MHz, emissions, on average, are held below 25 dB microvolt/meter.

5. In the frequency range from about 100 MHz to about 1,000 MHz, emissions, on average, are held below 30 dB microvolt/meter.

Figure 2:
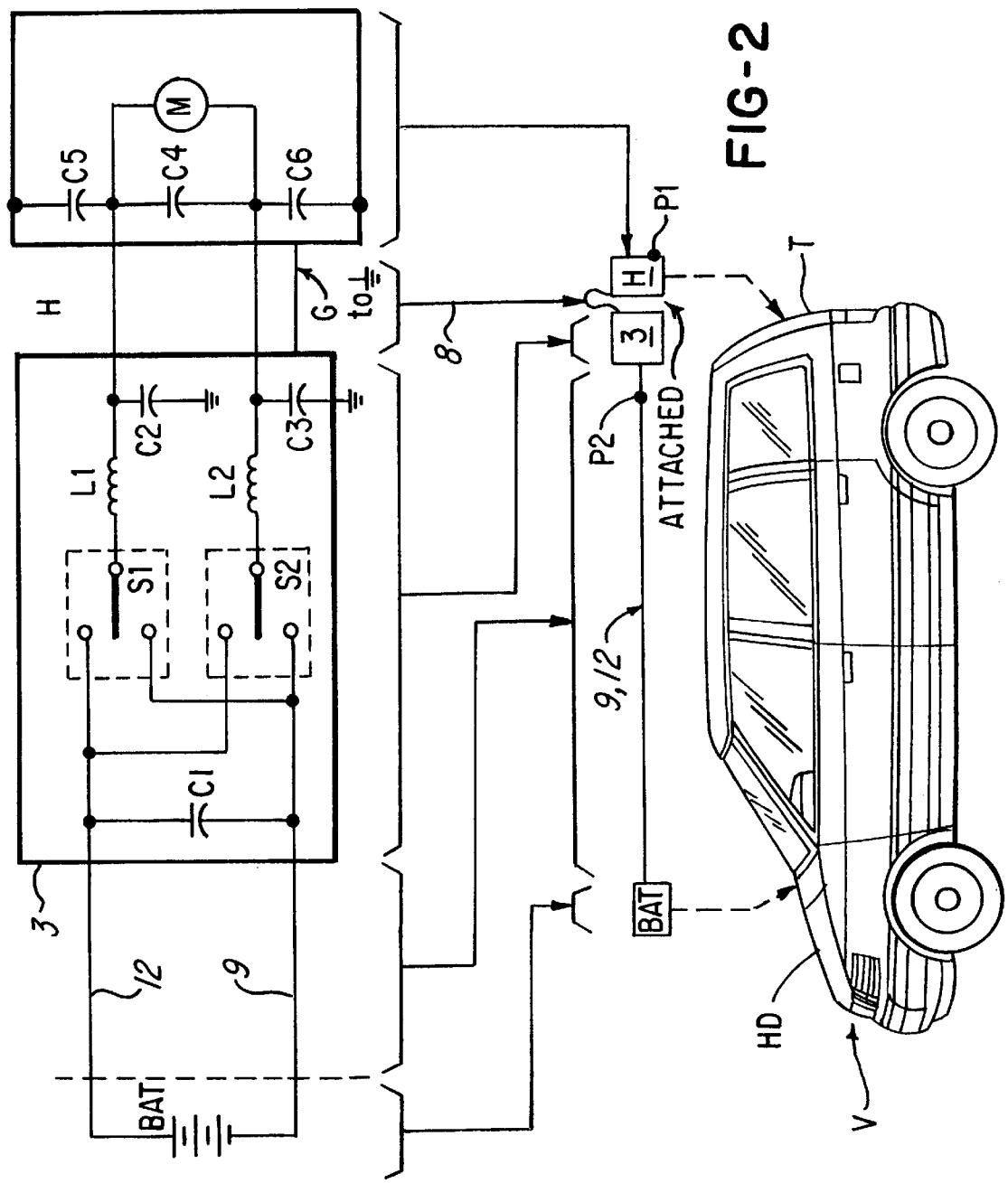
FIG. 2 illustrates one form of the invention.

In one embodiment, the apparatus of FIG. 4 is implemented as shown in FIG. 2, and is conceptually broken into the five components shown at the top of FIG. 2. The location of each of the five components within a vehicle V are indicated at the bottom of FIG. 2.

Specifically, the vehicle's storage battery BAT is located under the hood HD. Heavy line 3 in FIGS. 2 and 4 indicates a housing, which is non-conductive. The components located within this housing 3 form a control system. This control system 3 is physically attached to the housing H of the motor M, as indicated by the label "ATTACHED" in FIG. 2. Power supply cables 9 and 12 run from the battery BAT to the control system 3. (The wiper switch, under control of the driver of the vehicle, and commonly located on the steering column or dashboard, is not shown.) The control 3 delivers power to the motor M through extension cables 8.

Second Embodiment

FIG. 6 illustrates a second embodiment. A braided shield S surrounds the extension cables 8, which are also shown in FIG. 2. This shield S may also enclose inductors L1 and L2. Another pair of inductors, L3 and L4, located within the motor housing H, are connected between the power leads 25 and 30 of the motor M and respective nodes N1 and N2. These power leads connect directly to the brushes (not shown) of the motor M.

Capacitors C2 and C3 of FIG. 4 are absent from FIG. 6. The shield S is connected to the housing H by line 35 and to the vehicle ground by line 40. Line 40 would extend approximately from point P1 to point P2 in FIG. 2. Line 40 preferably takes the shortest distance from the housing H to a ground lead within the controller 3, and will be approximately as long as leads 8 in FIG. 2.

Table 2, below, gives the values of the components of FIG. 6.

TABLE 2

| Component in FIG. 6 | Component Value |
|---|---|
| L1, L2, L3, L4 | 1.8 microHenry |
| C1 | 0.22 microFarad in parallel with 0.47 microFarad (stacked film) |
| C4, C5, C6 | 0.1 microFarad (stacked film) |

FIGS. 7A–7B illustrate results of a bench test of rf emissions produced by the system of FIG. 6, but with capacitor C5 absent. The dotted line corresponds to that of FIGS. 3A–3B. Several significant features of FIGS. 7A–7B are the following:

1. In the frequency range from about 1.0 MHz to about 50 MHz, emissions are held below 30 dB-microvolt/m.

2. In the frequency range from about 1.0 MHz to about 1,000 MHz, emissions, on average, are held below 30 dB microvolt/meter.

3. In the frequency range from about 1.0 MHz to about 10 MHz, emissions, on average, are held below 35 dB microvolt/meter.

4. In the frequency range from about 10 MHz to about 100 MHz, emissions, on average, are held below 25 dB microvolt/meter.

5. In the frequency range from about 100 MHz to about 1,000 MHz, emissions, on average, are held below 30 dB microvolt/meter.

Additional Considerations

1. OTHER EMBODIMENTS.

Experimentation was involved in attaining the designs of FIGS. 4 and 6. FIGS. 8–14 illustrate some of the other approaches.

In FIG. 8, several approaches were independently taken. In one approach, extension cables 9 and 12 of FIG. 2 were formed into a twisted-wire pair labeled "9, 12" in FIG. 8. In a second approach, cables 8 in FIG. 2, leading from the housing of controller 3 to the motor housing H, were formed into a twisted-wire pair 8A in FIG. 8. In a third approach, a copper shield 100 was placed around the controller housing 3. In a fourth approach, ferrite beads were placed on (1) the cable pair 9 and 12 in FIG. 2, (2) cables 8 in FIG. 2, and (3) cables 8, 9, and 12.

In FIG. 9, an attempt was made to shunt rf energy to ground, by additional capacitors Ca. (Two pairs of capacitors Ca are shown, and represent various numbers of shunting capacitors tested.) One motivation behind the use of these capacitors is that they may prove less expensive than inductors such as L1 in FIG. 4.

That is, inductor L1, and others like it, must carry the current provided to the motor M. Many of the wires carrying this current are in the range of 20-gauge in size. The inductors, being in series with such wires, must have similar current-carrying capacity, and can be large and costly.

In FIG. 10, capacitors, such as CA, were placed across the terminals of the relays. These capacitors were placed across all pairs of terminals A, B, and C in relay S1, namely, across pairs AB, AC, BC. Further, capacitors were placed across combinations of pairs, such as AB plus BC. This approach was also taken with respect to relay S2.

In FIG. 11, inductors L1 and L2 of FIG. 6 were eliminated, in order to examine whether L1 and L2 were redundant, in view of the fact that, in FIG. 6, inductors L1 and L2 are in series with inductors L3 and L4.

In FIG. 12, inductor L1 of FIG. 2 was used, but not inductor L2. In a sense, an inductor L2 having a value of zero Henries was used. In other experiments, inductors L1 and L2 were assigned different values.

Figure 13:
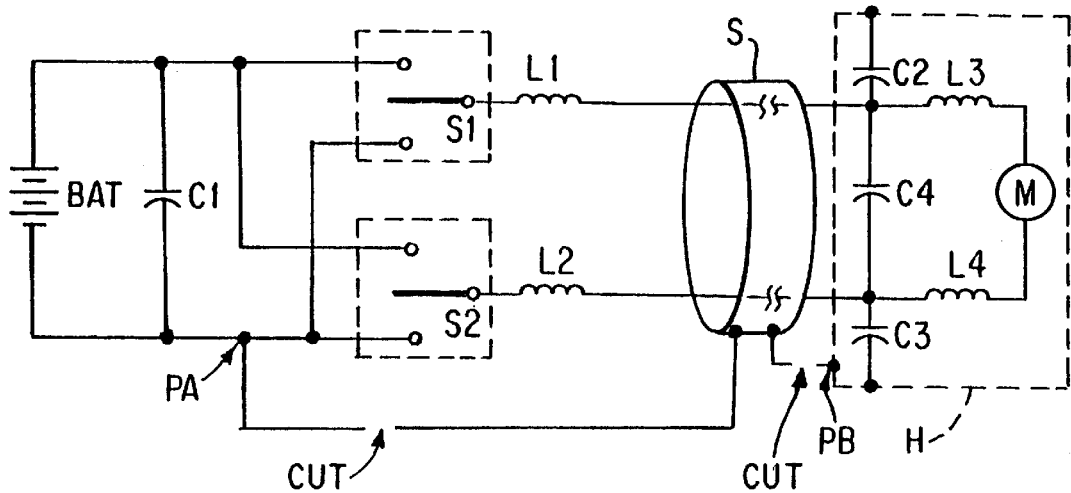

In FIG. 13, the two lines which ground the shield S were selectively disconnected, as indicated by the call-out "CUT." In particular, it was found that, even if the shield S was grounded to point PA, but not to point PB, good EMI suppression was not obtained.

Figure 14:
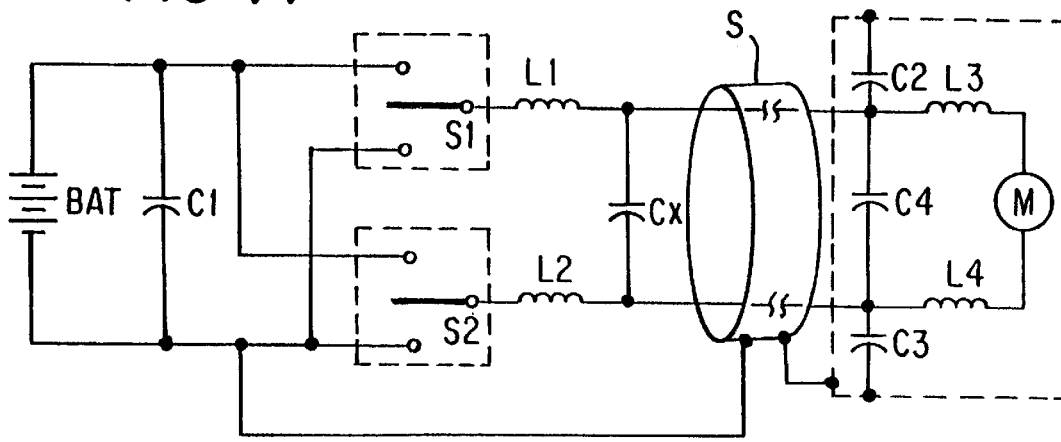

In FIG. 14, capacitor Cx was added, across the output leads of the relays S1 and S2. This capacitor worsened EMI suppression. Each of the configurations described above, in connection with FIGS. 8–14, failed to provide EMI suppression which was deemed equal to that provided by the apparatus of FIGS. 4 or 6. Further, based on test results of the apparatus shown in FIGS. 8–14, the Inventors have derived the following hypotheses:

1) Inductor L1 in FIG. 6 is not redundant to inductor L3, nor is L2 redundant to L4.
2) Failing to ground the shield S in FIG. 13 at either point PA or PB worsens EMI suppression compared with grounding shield S at both points.
3) Inductors L1 and L2 must be substantially identical in value (in Henries), as must inductors L3 and L4.
4) Twisted leads are not significantly beneficial.

In addition, the Tables given above indicate that capacitor Cl took the form of two individual capacitors, placed in parallel. These parallel capacitors were observed to provide better EMI suppression than a single capacitor, of capacitance equivalent to the parallel pair. This observation may indicate that the nominal, stated values of the capacitors may change over the frequencies tested in the plots of FIGS. 5A–5B and 7A–7B.

2. POSSIBLE EXPLANATIONS FOR OPERATION OF INVENTION.

Significant complications arise if one attempts an explanation of how the embodiments shown in FIGS. 4 and 6 provide the noise reduction shown in FIGS. 5A–5B and 7A–7B. Several such complications will now be discussed.

1. Within the motor M, electrical arcing occurs between the brushes and the commutator (neither is shown). Electrical arcing is commonly thought to be a source of electrical noise, and particular high-frequency noise.

However, motor M is contained within a conductive housing H. Housing H surrounds the motor M, except for apertures through which the power conductors enter. This housing H should, in theory, act as a shield, and capture rf emissions, except for emissions of very short wavelength, which may escape through the apertures. But, as FIGS. 3A–3B indicate, the measured data does not seem to be consistent with this theory. Large amounts of low frequency rf emissions occur, which are apparently not blocked by the housing, as theory would predict.

2. As another example, the arcing within motor M is supplied by current which flows on lines 9 and 12 in FIG. 2. These lines are relatively long, in the range of 4 to 7 feet. These lines should act as good antennas, and should efficiently radiate wavelengths of approximately the same lengths as the lines.

In quantitative terms, radiation at 0.3 MHz has a wavelength of 1,000 meters in air; radiation at 300 MHz has a wavelength of 1 meter. If the lines 9 and 12 are assumed to be 2 meters in length, then the frequency for such a wavelength is 150 MHz.

But a comparison of FIGS. 3A–3B and 5A–5B indicate that the invention of FIG. 4 suppresses radiation at this wavelength. Thus, again, the data is not consistent with this theory.

3. As a third example, arcing also occurs at the contacts of relays S1 and S2 of FIG. 4, when they switch. However, these relays S1 and S2 are not shielded: housing 3 is not constructed of a conductive material. Further, lines 9 and 12, discussed above, provide the current which feeds this arcing. Again, in theory, these lines 9 and 12 should act as antennas for radiation of energy carried by this current. However, the plots appear to indicate that the invention either suppresses this radiation, or that these lines do not act as antennas.

4. As a fourth example, extension cables 8 in FIG. 2 may also act as antennas. However, these cables are short, in terms of wavelength, at 6 to 12 inches. (One foot is about one-third of a meter, and thus corresponds to a frequency of about 900 MHz.)

Yet, in FIG. 4, these cables are exposed, and in FIG. 6 they are shielded. But it seems that FIGS. 5A–5B and 7A–7B do not show a significant difference in radiation at this frequency in the two cases.

5. The test results shown in FIGS. 3A–3B, 5A–5B, and 7A–7B were obtained using conventional test procedures defined in the test specification entitled "Radiated Emissions from 10 KHz to 1,000 MHz," which is contained in a publication entitled *General Motors Engineering Standards, Materials and Processes—Electrical* in the section entitled "EMC Component Test Procedure GM 9114P." This test specification will be identified as "GM 9114P" herein.

Numerous substitutions and modifications can be undertaken without departing from the true spirit and scope of the invention. What is desired to be secured by Letters Patent is the invention as defined in the following claims.

We claim:

1. A windshield wiper motor for a vehicle, comprising:
   a) a conductive housing containing the motor;
   b) first and second power leads entering the housing; and
   c) within the housing, a radio-frequency short circuit which shorts the power leads to the housing and to each other.

2. Motor according to claim 1, and further comprising
   d) at least one inductor
      i) connected in series with one of the power leads, and
      ii) located within the housing.

3. An electronic apparatus, comprising:
   a) a conductive housing containing
      i) a rotor of a motor;
      ii) first and second power leads; and
      iii) a radio-frequency short circuit which shorts the power leads to the housing and to each other.

4. Electronic apparatus according to claim 3, and further comprising:
   b) a control effective to deliver current to the power leads, and reverse the current, which comprises
      i) output leads connecting to the power leads;

ii) two inductors, each connected in series with a respective output lead;

iii) two capacitors, each connecting a respective output lead to ground;

iv) a capacitor which
   A) connects to the output leads with one polarity, when the current travels in one direction; and
   B) connects to the output leads with a reversed polarity, when the current reverses direction.

5. Motorized system for a motor vehicle, comprising:
a) an electric motor (M), contained in a conductive housing (H), and having first and second power leads (25, 30), connecting to respective first and second nodes (N1, N2);
b) three capacitors, located within said conductive housing, and connected such that
   i) a first capacitor (C5) connects the housing (H) to the first node (N1)
   ii) a second capacitor (C4) connects the first node (N1) to the second node (N2); and
   iii) a third capacitor (C6) connects the housing (H) to the second node (N2);
c) a control (3), which
   i) receives current on first and second supply leads (Pin1, Pin2);
   ii) contains a fourth capacitor (C1) which connects the first supply lead (Pin1) with the second supply lead (Pin2);
   iii) contains a switching system which is effective to
      A) deliver current to first and second output leads (Pout1, Pout2); and
      B) reverse direction of the current delivered;
   iv) contains a first inductor (L1) interconnected in the first output lead (Pout1);
   v) contains a second inductor (L2) interconnected in the second output lead (Pout2);
   vi) contains a fifth capacitor (C2) which connects the first output lead (Pout1) to ground; and
   vii) contains a sixth capacitor (C3) which connects the second output lead (Pout2) to ground;
d) a pair of extension leads (8) connecting
   i) the first output lead (Pout1) to the first node (N1), and
   ii) the second output lead (Pout2) to the second node (N2); and
e) a ground connection (G), in addition to any ground path provided by the vehicle, connecting the housing (H) with a ground in the control.

6. Apparatus according to claim 5, wherein the first and second inductors are substantially identical in value.

7. For a windshield wiper motor, apparatus comprising:
a) a control for reversing motor direction; and
b) noise suppression means for holding radiated noise produced by said control to below about 40 dB microvolt/meter, in a band spanning from about 1.0 MHz to about 100 MHz, as measured by test specification GM 9114P.

8. Apparatus according to claim 7, and further comprising:
c) means for holding radiated noise to below about 30 dB microvolt/meter, in a band spanning from about 20 MHz to about 70 MHz.

9. For a windshield wiper motor, apparatus comprising:
a) a control for reversing motor direction; and
b) noise suppression means for holding radiated noise produced by said control to below about 40 dB microvolt/meter, for at least 90 percent of a band spanning from about 1.0 MHz to about 1,000 MHz.

10. A motor system for windshield wiper in a motor vehicle, comprising:
a) an electric motor (M), housed in a conductive housing (H), and having first and second power leads (25, 30);
b) a first inductor (L3), located within said conductive housing (H), and connected in series between the first power lead (25) and a first node (N1);
c) a second inductor (L4), located within said conductive housing (H), and connected in series between the second power lead (30) and a second node (N2);
d) three capacitors, located within said conductive housing (H), and connected such that
   i) a first capacitor (C5) connects the housing (H) to the first node (N1);
   ii) a second capacitor (C4) connects the first node (N1) with the second node (N2); and
   iii) a third capacitor (C6) connects the housing (H) to the second node (N2);
e) a control (3), which
   i) receives power on first and second supply leads (Pin1, Pin2);
   ii) contains a fourth capacitor (C1) which connects the first supply lead (Pin1) with the second supply lead (Pin2);
   iii) contains a switching system which is effective to
      A) deliver current to first and second output leads (Pout1, Pout2); and
      B) reverse direction of the current delivered;
   iv) contains a first inductor (L1) interconnected in the first output lead (Pout1);
   v) contains a second inductor (12) interconnected in the second output lead (Pout2);
f) a pair of extension leads (8), each exceeding four feet in length, and connecting
   i) the first output lead (Pout1) to the first node (N1), and
   ii) the second output lead (Pout2) to the second node (N2);
g) a conductive shield (S), surrounding the extension leads (8) along substantially their entire lengths;
h) a first ground line (40), connecting the shield (S) to a ground within the controller; and
i) a second ground line (35), connecting the shield (S) with the conductive housing (H).

11. System according to claim 5, wherein
A) the electric motor (M) is carried by a tailgate of the vehicle,
B) the control (3) is adjacent the electric motor (M), and
C) the first and second supply leads (Pin1, Pin2) connect the control (3) with a storage battery (BAT), located in an engine compartment, located at the forward end of the vehicle.

12. System according to claim 10, wherein
A) the electric motor (M) is carried by a tailgate of the vehicle,
B) the control (3) is adjacent the electric motor (M), and
C) the first and second supply leads (Pin1, Pin2) connect the control (3) with a storage battery (BAT), located in an engine compartment, located at the forward end of the vehicle.

* * * * *